United States Patent
Chaussade et al.

(10) Patent No.: US 6,708,595 B1
(45) Date of Patent: Mar. 23, 2004

(54) LAMINATED, REINFORCED GLASS PLATE

(75) Inventors: Pierre Chaussade, Orleans (FR); Noël Gourio, Orleans (FR); Hervé Lehrmann, Orleans (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/018,751

(22) PCT Filed: Jun. 23, 2000

(86) PCT No.: PCT/FR00/01762

§ 371 (c)(1),
(2), (4) Date: Jun. 7, 2002

(87) PCT Pub. No.: WO01/00403

PCT Pub. Date: Jan. 4, 2001

(30) Foreign Application Priority Data

Jun. 25, 1999 (FR) .............................. 99 08154

(51) Int. Cl.[7] .............................. F41H 5/02; F41H 5/04; F41H 7/02; F41H 5/26
(52) U.S. Cl. .................... 89/36.02; 89/36.08; 428/911
(58) Field of Search ............................. 89/36.02, 36.04, 89/36.07, 36.08, 36.09; 428/911

(56) References Cited

U.S. PATENT DOCUMENTS

| 3,616,122 A | | 10/1971 | Orcutt | |
|---|---|---|---|---|
| 4,243,719 A | * | 1/1981 | Holmes | 340/550 |
| 4,277,294 A | | 7/1981 | Orcutt | |
| 4,595,624 A | * | 6/1986 | Greathead | 428/213 |
| 4,923,757 A | * | 5/1990 | O'Dwyer et al. | 428/425.6 |
| 5,270,518 A | * | 12/1993 | Naoumenko et al. | 219/203 |
| 5,368,904 A | * | 11/1994 | Stephinson | 428/34 |
| 5,567,529 A | * | 10/1996 | Smith | 428/425.6 |
| 6,129,974 A | | 10/2000 | Woll | |
| 6,280,826 B1 | * | 8/2001 | Woll et al. | 428/192 |
| 6,569,787 B1 | * | 5/2003 | Snelling | 442/135 |
| 2001/0032540 A1 | | 10/2001 | Gourio | |

FOREIGN PATENT DOCUMENTS

| DE | 41 42 416 | | 6/1993 | |
|---|---|---|---|---|
| DE | 44 15 879 | | 11/1995 | |
| DE | 197 29 897 | | 10/1998 | |
| DE | 197 45 248 | | 4/1999 | |
| DE | 19947680 A1 | * | 6/2000 | F41H/5/26 |
| DE | 10043793 A1 | * | 3/2002 | F41H/5/26 |
| EP | 109566 A2 | * | 5/1984 | F41H/5/26 |
| FR | 2 764 841 | | 12/1998 | |
| WO | 99 39152 | | 8/1999 | |

* cited by examiner

*Primary Examiner*—Charles T. Jordan
*Assistant Examiner*—John W. Zerr
(74) *Attorney, Agent, or Firm*—Wenderoth, Lind & Ponack, L.L.P.

(57) ABSTRACT

A bullet-proof and/or shatter-proof toughened, laminated glass plate includes a stack of glass sheets. A central ballistic system (BC) of the glass plate has, at its peripheral region corresponding to a reinforcing element (C) of the peripheral ballistic system (BP), one or more reinforcing cladding portions made from a high-strength ballistic material, and integrated in the stack. At least one of the reinforcing cladding portions is integral with the element (C) (i.e., a one-piece construction).

31 Claims, 2 Drawing Sheets

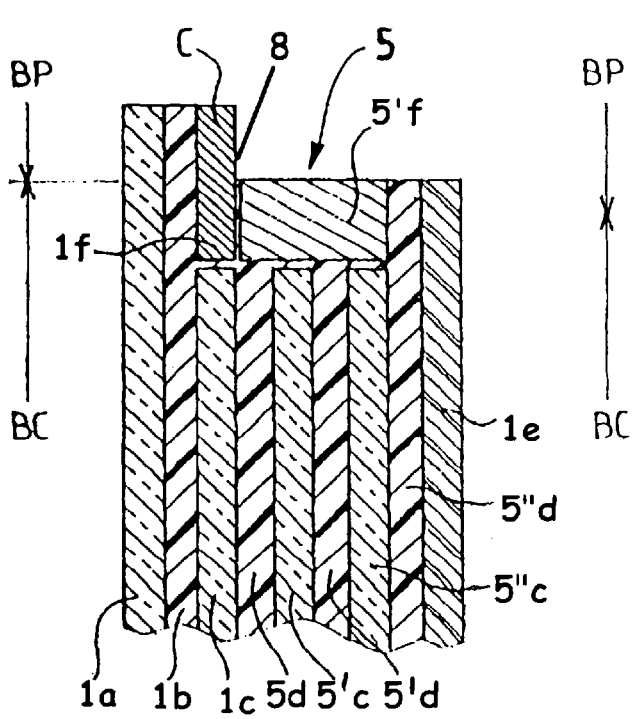
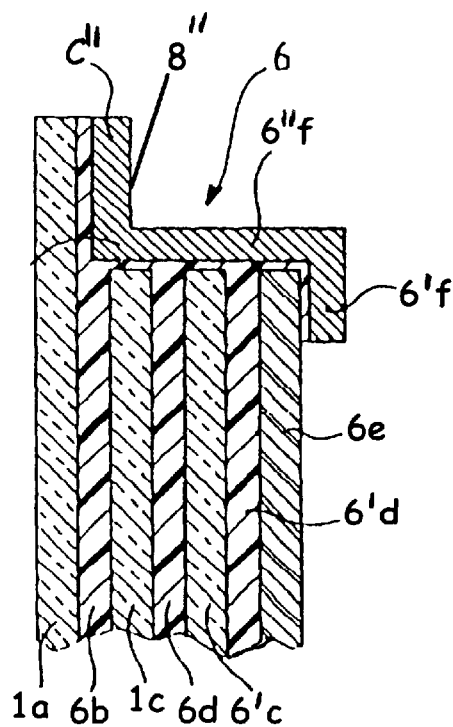
FIG.5  FIG.6
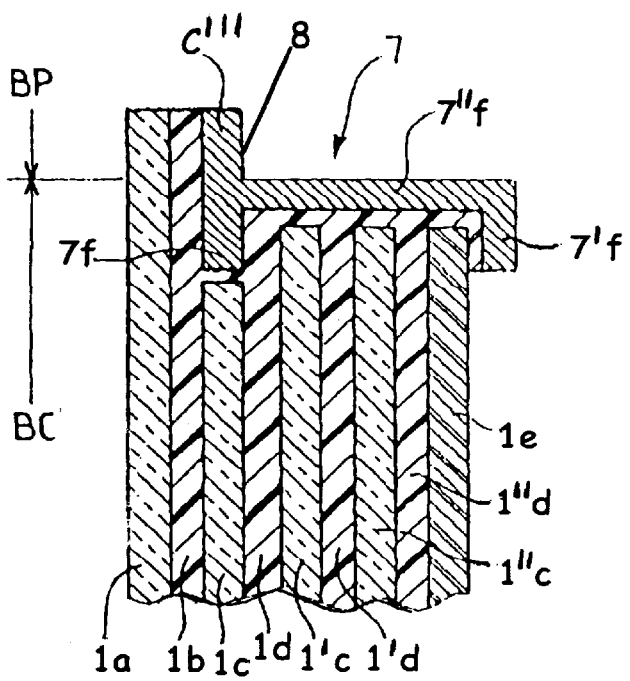
FIG.7

LAMINATED, REINFORCED GLASS PLATE

BACKGROUND OF THE INVENTION

The present invention relates to bullet-proof and/or shatter-proof toughened, laminated plate glass, which may be used to protect road vehicles, rolling stock, sea-going vessels or aircraft. In particular, the glass may be used in motor vehicles such as armored cars and military vehicles, as well as security vans for transporting cash. However, the toughened, laminated plate glass of the present invention may also be used to protect buildings. This glazing may also be fixed or mobile.

A great deal of effort has gone into improving, armored glass, in particular with a view to increasing it's ability of the glass to withstand increasingly high-performance bullets and more powerful impacts concentrated on a small surface area.

In a previous attempt to improve the ballistic performance of glass of this type, the present applicant proposed a bullet-proof and/or shatter-proof toughened, laminated glass in French patent application FR-A-2 764 841, in which one or more rigid excrescences were formed on at least a part of a periphery, each substantially belonging to a plane parallel with the surface defined by the plate glass or with the extension of this surface and being of a thickness such that it could be introduced, at least partially, temporarily or permanently, into the rebate of the glazing aperture.

The strongest embodiment described in said French patent application FR-A-2 764 841 is the one illustrated in FIG. 4 of the publication. It consists, from the outside to the inside (in the present description, the outside end is the end from which the impact is likely to occur), of:

- ① a sheet of chemically reinforced glass or a stack comprising a sheet of glass, an intermediate adhesive layer of polyvinyl butyral (PVB), and a sheet of glass; and
- ② a stack of sheets made up of:
  - ②a an intermediate adhesive layer of PVB;
  - ②b sheet of glass;
  - ②c an intermediate adhesive layer of PVB,
  - ②d sheet of glass;
  - ②e an intermediate adhesive layer of polyurethane (PU); and
  - ②f a sheet of polycarbonate, the inside face of which is generally coated with an anti-scratch lacquer.

The surface area of stack ② is smaller than that of the sheet or stack ② so that the periphery of this sheet or stack ① extends uniformly beyond that of stack ②. A peripheral band is applied against the periphery of sheet or stack ①, and the band is joined, by bonding for example, to the inside face of the sheet or stack ① projecting beyond the stack ②. This peripheral band is also joined at its inner edge, for example by bonding, to the outer edge of the stack ②, against which it is supported.

The unit comprising the peripheral band and the peripheral zone of the sheet or stack ① may be inserted in a rebate of an aperture or simply placed so that it is supported thereon and nested to a greater or lesser degree relative to the structure of this aperture, directed towards the outside, depending on the shapes of aperture used.

A toughened, laminated plate glass made in this way has two juxtaposed ballistic systems. In particular, the glass has a first, central ballistic system constituted by stack ② and the central zone of the sheet ① or stack ① facing the stack ②; and a second, peripheral ballistic system, formed by the peripheral band and the peripheral region of the sheet ① or stack ① facing the peripheral band.

The toughened, laminated glass pane proposed in the French application is totally satisfactory compared with known armored glass in terms of withstanding higher-performance projectiles and more powerful and more numerous impacts, regardless of whether they are simultaneous or consecutive. However, this toughened, laminated glass pane has a weak spot in the edge region. In other words, there is a weak spot in the zone at which the two ballistic systems described above (central and peripheral) meet. In practice, this zone may be in the order of 0.5 to 3 cm in width and a marksman can therefore aim for and hit it.

It goes without saying that this weak spot in the edge region needs to be eliminated in the most radical way possible, especially as the excrescence by which the pane is inserted in its rebate is small in height (in the order of 1 to a few cm in the case of car windows), and given that it is not desirable to use a reinforcement overlapped by the structure supporting the glazing (bodywork) so as to avoid losing window light and for reasons of cost.

SUMMARY OF THE INVENTION

The present invention meets this objective. To this end, it is proposed that the reinforcing element (band), having a high ballistic strength and forming part of the second ballistic system be extended towards the center in order to form at least one ballistic layer which integrates with the first ballistic system over a length likely to cover the edge region that is less well protected. Consequently, it has been found possible to use embodiments of various shapes in order to meet specific protection requirements (in particular, to reinforce this protection), and also to adapt the toughened laminated glass to existing chassis designs (in particular, to meet the thickness constraints of aperture rebates on cars).

Accordingly, the present invention relates to a pane of bullet-proof and/or shatter-proof toughened, laminated glass, in which a part of the stack comprising the pane extends, on at least a part of the periphery of the pane, beyond the rest of the stack. Thus, an excrescence against which the reinforcing element made from a high-strength ballistic material can be applied, from the inside if the impact is likely to be generated from the outside, is formed integral with the pane. The pane of glass includes a peripheral ballistic system (BP), formed by the excrescence and the band (C), so that the pane can be mounted in the rebate of the structure designed to bear the pane. The rest of the pane thus forms a central ballistic system (BC). In this regard, the term "center" or "central" as used herein refer to the center of a plate glass (pane) with respect to a geometric plane of the plate glass (pane). The central ballistic system (BC) has, at its peripheral region corresponding to that of the reinforcing element (C) of the peripheral ballistic system (BP), one or more reinforcing layers of cladding made from a high-strength ballistic material and integrated in the stack constituting the pane. The single reinforcing layer of cladding, or at least one of the reinforcing layers of cladding if there are or more than one, is joined to the element (C).

The peripheral region of the central ballistic system (BC) corresponding to that of the reinforcing element (C) of the peripheral ballistic system (BP) does not generally have a reinforcing layer of cladding on the external side of the pane relative to the band (C).

In a particularly preferred manner, the toughened, laminated plate glass of the invention is made up of a stack of sheets of glass alternating with intermediate adhesive layers, starting with a sheet of glass on the outer side and terminating on the inner side also with a sheet of glass. In this regard, the terms "inner" and "outer" as used herein refer to the sides of the glass plate as installed. In contrast, the term "internal" refers to a location within the glass plate (e.g., between two adjacent sheets of glass), while the term "external" refers to a location not within the glass plate. The reinforcing element (C), the reinforcing layer or layers of cladding (cladding portions) and, if applicable, the linking elements between the element (C) and the reinforcing layer or layers of cladding are integrated in the glass plate by one or more intermediate adhesive layers or by some of the layers, or of an intermediate adhesive material, such as the same type as that constituting the intermediate adhesive layers.

BRIEF DESCRIPTION OF THE DRAWINGS

FIG. 5 is a cross-sectional view of a fifth embodiment of the present invention;

FIG. 6 is a cross-sectional view of a sixth embodiment of the present invention; and FIG. 7 is a cross-sectional view of a seventh embodiment of the present invention.

DETAILED DESCRIPTION OF THE INVENTION

Figure 1:
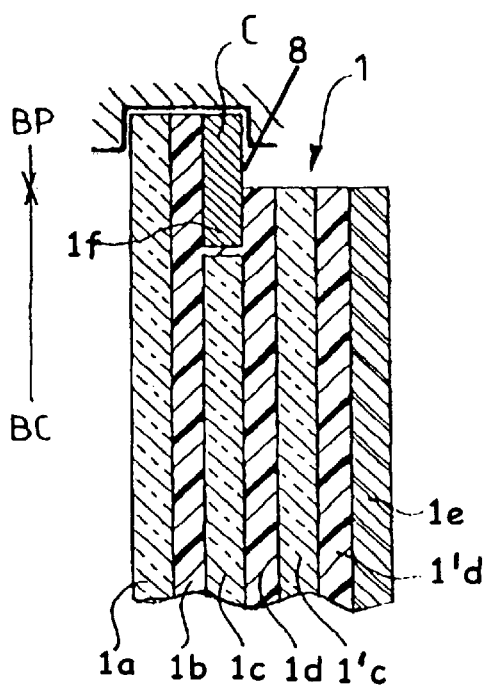
FIG. 1 is a cross-sectional view of a first embodiment of the present invention.

In a first embodiment, the toughened, laminated glass plate of the invention has a reinforcing element (C) with an internal reinforcing cladding portion $1f$ extending from a main reinforcing cladding portion 8 which is integrally continuous therewith. The internal reinforcing cladding portion $1f$ forming the extension of the reinforcing element (C) may then occupy the position which would normally be occupied by a sheet of glass forming part of the central ballistic system (BC) or alternatively may be spaced apart from a sheet of glass.

In the former case, the reinforcing element formed by the main cladding portion 8 and its extension (portion $1f$) may be of the same width as the sheet of glass and disposed flush with it, in which case the sheet of glass is simply shortened. The reinforcing element may also have a smaller width than that of the sheet of glass, in which case, the sheet of glass has simply been shortened and the space that was normally occupied by the glass is filled with the intermediate adhesive material. Alternatively, the sheet of glass has a spot facing in which the extension of the reinforcing element is integrated, in which case the sheet of glass incorporating the spot facing may be thicker than the other sheets of glass in the stack.

Still in accordance with this first embodiment, the pane may have at least one reinforcing layer of cladding which is integrated in the laminated structure and which may or may not be independent of the extension of the reinforcing element (C). This being the case, in a first variant, at least one second internal reinforcing cladding portion $1'f$ is disposed within an intermediate adhesive layer between two sheets of glass. In a second variant, at least one reinforcing layer of cladding is provided in the form of an insert or a block, which may extend across a distance at most equal to the distance between the internal cladding portion of the reinforcing element (C) and the inner side of the pane.

In a second embodiment, the toughened, laminated plate glass of the present invention has at least one reinforcing external cladding portion which is joined to the main cladding portion 8 by an annular part supported against the periphery of the pane on a level with the central ballistic system (BC), the reinforcing layer or layers of cladding being disposed between the extension of the element (C) and the interior side of the pane. The reinforcing external cladding portion 6F, 7F may be applied against the inner side of the pane, and the element (C) may also have an extension forming an internal reinforcing cladding portion 7F within said central ballistic system (BC). The annular part is joined to the structure of the pane by an intermediate adhesive material.

Furthermore, the excrescence forming the peripheral ballistic system (BP) in conjunction with the reinforcing element (C) is generally provided at the outer edge or in the vicinity of the outer edge of the pane.

The high-strength ballistic material or materials used for armoring the toughened laminated plate glass of the present invention are materials which, all threats being equal, are 2 to 10 times less thick than the glass, so as to be bullet-proof They are selected in particular from the metals and metal alloys, such as steel, plastics-fibre composite materials and ceramics. The fibres incorporated in making composites are glass, aramide or ceramic fibres in particular, and one example of a plastics material used in composites is polyethylene.

In accordance with one particular preferred embodiment of the toughened laminated plate glass of the invention, the stack of layers and sheets is flat or cambered and comprises, from the outside to the inside:

(a) a sheet of glass of, in particular the glass ceramic type, annealed glass, or chemically or heat-reinforced glass;

(b) an intermediate adhesive layer;

(c) a sheet of glass of, in particular, the annealed glass type, or glass which has been chemically or heat-reinforced;

(d) an intermediate adhesive layer; if necessary, at least one other sub-stack of type (c), (d) in that order; and (e) a layer of polycarbonate (PC). These sheets of glass, layers of adhesive, and polycarbonate layer are arranged to form a main portion of the stack having a peripheral edge, and to form an excrescence that extends beyond the peripheral edge of the main portion.

The intermediate adhesive layers are made, in particular, from a material such as polyvinyl butyral (PVB) and polyurethane (PU). The stack may also incorporate any conventional functional thin layer, such as a coloring, optical, anti-glare, anti-dirt, anti-scratch, anti-frost function and/or any network of antenna conductors or heating wires and/or any peripheral cladding of enamel or opaque paint, such as in the form of dots.

The toughened, laminated glazing of the invention is made by conventional methods and optionally incorporates cambering of the folds of glass, making up of the laminate by superposing folds or sheets of glass and intermediate layers in the selected order, assembling them, and feeding them through an autoclave to apply heat and pressure. In the present invention, the toughening elements and reinforcing elements of cladding described above are integrated as a unit when making the laminate.

The reinforcing layer or layers of cladding (cladding portions) extend into the central ballistic system (BC) (i.e., past the peripheral edge of the stack of glass sheets) by a distance in the order of 0.5–3 cm, particularly if the pane is to be used as a side window of a motor vehicle. In addition, the peripheral ballistic system (BP) and its associated reinforcement generally extend around the entire periphery of the window. However, it may not extend around a region of the edge where there is no window rebate.

The height of the excrescence by which the pane is inserted in the aperture rebate is generally in the order of 20 to 80% of the height of the peripheral ballistic system (BP), and the thickness of the pane may vary between 10 and 70 mm.

In order to provide a clearer illustration of the invention, several embodiments will be described below with reference to the appended drawings, although these are given as illustrative examples and not restrictive in any respect. In the drawings, FIGS. 1 to 7 each give a schematic view of one of the embodiments in partial cross section, on an enlarged scale, the plane of section passing through the element or elements constituting the reinforcement.

The various sheets and layers of the laminated structure are not illustrated to scale, and some (in particular, the intermediate adhesive layers) are often shown larger than they are in reality, the intention being to show how they fit into the structure. The various ranges of dimensions of the basic laminated structure and the values relating to the dimensions of these various sheets and layers of which it is comprised are values with which the person skilled in the art of making laminated glass is perfectly familiar. Any such dimensions given below are given by way of illustration only.

In FIG. 1, reference 1 denotes a toughened, laminated plate glass as a whole. The plate glass 1 includes, from the outside to the inside, a first sheet 1a of glass ceramic or annealed glass or chemically or heat-reinforced glass, 6 mm thick, a first intermediate adhesive layer 1b of PVB, 0.76 mm thick; a second sheet 1c of annealed or chemically or heat-reinforced glass, 3 mm thick, a second intermediate adhesive layer 1d of PVB, 0.76 mm thick; a sub-stack including a third glass sheet 1'c, and third adhesive layer 1'd identical to the above-mentioned sub-stack 1c, 1d except that the intermediate adhesive layer 1'd is made from PU; and a sheet 1e of polycarbonate (PC), 3 mm thick. The inside face of the sheet 1e may advantageously be coated with an anti-scratch lacquer (for example, a polysiloxane base) applied to a thickness of at most 15 μm, in particular 2 to 7 μm. All of these sheets and layers from 1a to 1e are transparent.

The outer first glass sheet 1a and the outside first adhesive layer 1b extend at their periphery beyond the peripheral edge of the stack including sheets 1c to 1e, the layers and sheets of which have the same surface area with the exception of second glass sheet 1c which has an even smaller surface area.

A reinforcing element C''' made from ballistic steel having the same width as the sheet 1c has a main cladding portion 8 extending radially outward from the peripheral edge of the stack and bonded to the first glass sheet 1a, and has an internal cladding portion 1f inserted between the first adhesive layer 1b and the second adhesive layer 1d and bonded against these layers. The inner edge of reinforcing element C is applied against the edge of first glass sheet 1c, where it is bonded by the PVB. The outer edge of reinforcing element C is disposed in the extension at the edge of the stack including first glass sheet 1a and first adhesive layer 1b.

Figure 4:
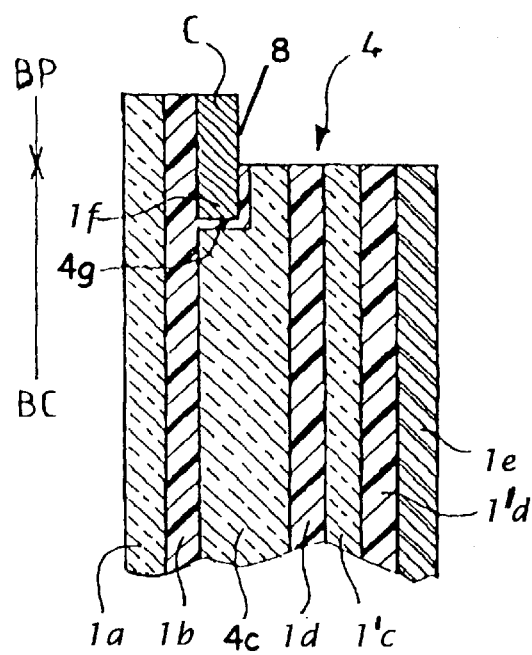
FIG. 4 is a cross-sectional view of a fourth embodiment of the present invention.

In FIG. 1, BC and BP denote the two ballistic systems in the laminated window illustrated, which were defined above with specific reference to FIG. 4 of the patent application mentioned earlier. As noted above, the reinforcing element belonging to the peripheral ballistic system BP is denoted by C (in this drawing being shown inserted in the rebate of the window aperture. The reinforcing element C has a reinforcing internal cladding portion 1f extending into the system BC (stack), in order to form the reinforcing element, and also has a main cladding portion 8 located at the inner surface of the first glass sheet 19 outside of the peripheral edge of the sheets 1c to 1e.

The same reference numbers in FIGS. 2 to 7 respectively, are used to identify like components in various embodiments. The description will concentrate on only those aspects which are different.

Figure 2:
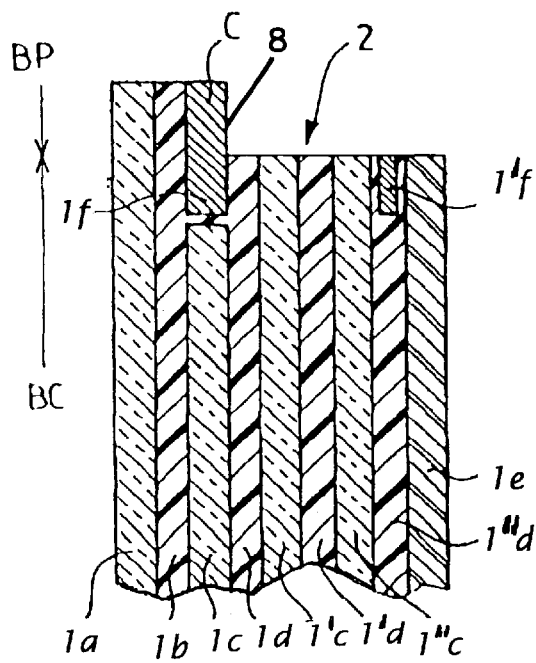
FIG. 2 is a cross-sectional view of a second embodiment of the present invention.

The plate glass 2 of FIG. 2 differs from the embodiment illustrated in FIG. 1 due to an additional stack including fourth glass sheet 1"c and fourth adhesive layer 1"d the third adhesive layer 1'd being PVB and the fourth adhesive layer 1"d being PU. Also disposed within fourth adhesive layer 1"d a second internal reinforcing cladding portion 1'f in the peripheral region of the system BC into which the first internal cladding portion 1f extends.

Figure 3:
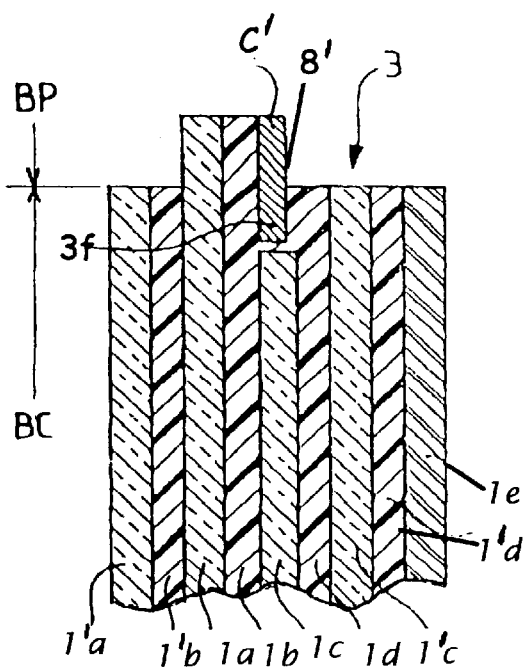
FIG. 3 is a cross-sectional view of a third embodiment of the present invention.

The glass plate 3 of FIG. 3 differs from the embodiment illustrated in FIG. 1 due to the presence of an additional outer stack including fourth glass sheet 1'a and fourth adhesive layer 1'b, so that the pane and bodywork will be in a flush alignment when assembled. Also illustrated is a reinforcing element c' having a main cladding portion 8' and an internal cladding portion 3f each with a lesser thickness than the second glass sheet 1c. In this case, an additional strip of PVB was applied against the inside face of the cladding portion 3f in the peripheral region of the system BC to compensate for the lesser thickness.

The plate glass 4 of FIG. 4 differs from the embodiment illustrated in FIG. 1 due to the presence of a wider second glass sheet 4c, which has a spot facing 4g to accommodate the corresponding part of the cladding portion 1f. As with the embodiment illustrated in FIG. 3, the cladding portion 1f and the second sheet of glass 4c are longitudinally bonded by PVB.

The glass plate 5 of FIG. 5 differs from the embodiment illustrated in FIG. 2 due to the presence of a cladding block or insert 5'f made from a plastics-fibre composite disposed between the internal cladding portion 1f and 1d in the peripheral region of the system BC. The inner edge of the cladding block 5'f is bonded to the edges of the third and fourth sheets 5'c and 5"c by PVB and between the internal cladding portion 1f and cladding portion 5'f. As can be seen in FIG. 5, second and third adhesive layers 5d and 5'd as well as third and fourth glass sheets 5'c and 5'd, are smaller than their counterpart components in the second embodiment in order to accommodate block 5'f.

The glass plate 6 of FIG. 6 differs from the embodiment illustrated in FIG. 1 in that a reinforcing element c" has an elongated main cladding portion 8" but no internal cladding portion, and the main cladding portion 8" is offset into first adhesive layer 6b so as to be closer to the first glass sheet 1a. The element c" is extended by two square-angled portions including an annular cladding portion 6"f, which is applied against second and third glass sheets 1c, 6'c, second and third adhesive layers 6d, 6'd, and polycarbonate sheet 6e, and an external cladding portion 6'f which is applied against an inner surface of polycarbonate sheet 6e in the peripheral region of the system BC. PVB forms the bond between parts 6'f and 6"f and the glass sheets. As in the fifth embodiment, the second and third adhesive layers 6d, 6'd, and the third glass sheet 6'c are smaller than their counterpart components in the first embodiment due to annular part 6'f. For this reason, polycarbonate sheet 6e is also smaller. Furthermore, as illustrated in FIG. 6, the annular portion 6"f of reinforcing element c" extends in the thickness direction of the glass plate 6 (along the peripheral edge of the stack), while main cladding portion 8" and external cladding portion 6'f extend in a radial direction of the glass plate at either end of the annular portion 6"f.

The glass plate of FIG. 7 differs from the embodiment illustrated in FIG. 6 due to an additional stack including fourth glass sheet 1"c and fourth adhesive layer 1"d. In addition, the reinforcing element C'" has an internal cladding portion 7f extending into the laminate, similar to the embodiment illustrated in FIG. 1, and an annular cladding portion 7"f extending in a thickness direction from the junction of main cladding portion 8 and internal cladding portion 7f along the peripheral edge of the stack. External cladding portion 7'f extends in a radial direction similar to cladding portion 6'f at an end of annular portion 7"f.

These embodiments of glass panes have all resisted impact from bullets fired into the edge region, which would previously have represented a weak spot of the armoring.

It should be pointed out that the embodiments described above are given by way of illustration, and are not restrictive. Thus, modifications may be made to them without departing from the scope of the present invention.

What is claimed is:

1. A laminated glass plate comprising:
    a plurality of glass sheets bonded together by an adhesive layer between adjacent glass sheets so as to form a stack having a main portion with a peripheral edge, and having an excrescence formed of a peripheral portion of at least one of said glass sheets of said stack extending beyond said peripheral edge of said main portion of said stack; and
    a reinforcing element formed of ballistic material, said reinforcing element having a main cladding portion bonded to an inner surface of said excrescence by an adhesive layer and extending from said peripheral edge of said main portion of said stack in a radially-outward direction along said excrescence, and having at least one of an internal cladding portion and an external cladding portion, said internal cladding portion extending from said peripheral edge of said main portion of said stack in a radially-inward direction toward a center of said stack between glass sheets, and said external cladding portion extending from said peripheral edge of said main portion of said stack in a radially-inward direction toward said center of said stack along an inner surface of said stack.

2. The glass plate of claim 1, wherein said stack has an outer-half portion including at least one outer glass plate, and has an inner-half portion including at least one inner glass plate, said reinforcing element having said internal cladding portion extending toward a center of said outer-half portion of said stack.

3. The glass plate of claim 1, wherein said reinforcing element has said internal cladding portion bonded to an inner surface of an outer-most glass sheet of said stack.

4. The glass plate of claim 1, wherein said stack and said reinforcing element are arranged so as to form a peripheral ballistic system, and so as to form a central ballistic system without a reinforcing element, said peripheral ballistic system surrounding said central ballistic system.

5. The glass plate of claim 4, wherein said stack includes an outermost first glass sheet, a second glass sheet bonded to an inner surface of said first glass sheet via an intervening first adhesive layer, and a third glass sheet bonded to an inner surface of said second glass sheet via an intervening second adhesive layer, said reinforcing element being bonded to said stack via at least one of said first adhesive layer and said second adhesive layer.

6. The glass plate of claim 4, wherein said reinforcing element having said main cladding portion and said at least one of an internal cladding portion and an external cladding portion has a one-piece construction.

7. The glass plate of claim 4, wherein said reinforcing element further has an annular cladding portion extending in a thickness direction of said stack along said peripheral edge of said main portion of said stack, said main cladding portion extending from a first side of said annular portion in the radially-outward direction, and said reinforcing element has said external cladding portion extending from a second side of said annular portion in the radially-inward direction toward said center of said stack, said annular cladding portion being bonded to said peripheral edge of said main portion of said stack by an adhesive material.

8. The glass plate of claim 7, wherein said reinforcing element further has said internal cladding portion extending from said first side of said annular portion in the radially-inward direction toward said center of said stack.

9. The glass plate claim 1, wherein said stack includes an outermost first glass sheet, a second glass sheet bonded to an inner surface of said first glass sheet via an intervening first adhesive layer, and a third glass sheet bonded to an inner surface of said second glass sheet via an intervening second adhesive layer, said reinforcing element being bonded to said stack via at least one of said first adhesive layer and said second adhesive layer.

10. The glass plate of claim 9, wherein said reinforcing element has said internal cladding portion, further comprising a cladding block arranged along said peripheral edge of said main portion of said stack between said internal cladding portion and an inner side of said stack.

11. The glass plate of claim 9, wherein said reinforcing element further has an annular cladding portion extending in a thickness direction of said stack along said peripheral edge of said main portion of said stack, said main cladding portion extending from a first side of said annular portion in the radially-outward direction, and said reinforcing element has said external cladding portion extending from a second side of said annular portion in the radially-inward direction toward said center of said stack, said annular cladding portion being bonded to said peripheral edge of said main portion of said stack by an adhesive material.

12. The glass plate of claim 11, wherein said reinforcing element further has said internal cladding portion extending from said first side of said annular portion in the radially-inward direction toward said center of said stack.

13. The glass plate of claim 9, wherein said reinforcing element has said internal cladding portion comprising a first internal cladding portion extending from said peripheral edge of said main portion of said stack toward a center of said stack between glass sheets, said glass plate further comprising a second internal cladding portion extending from said peripheral edge of said main portion of said stack toward a center of said stack within an adhesive material layer.

14. The glass plate of claim 13, wherein said second internal cladding portion comprises a cladding block arranged along said peripheral edge of said main portion of said stack between said first internal cladding portion and an inner side of said stack.

15. The glass plate of claim 9, wherein said reinforcing element having said main cladding portion and said at least one of an internal cladding portion and an external cladding portion has a one-piece construction.

16. The glass plate of claim 15, wherein said reinforcing element has an external cladding portion, and has no internal cladding portion.

17. The glass plate of claim 15, wherein said reinforcing element has an internal cladding portion extending toward an opposing one of said sheets of glass forming said stack and having a width equal to a width of said internal cladding portion such that said opposing one of said sheets of glass is smaller than each of the remaining sheets of glass forming said stack.

18. The glass plate of claim 17, wherein said internal cladding portion comprises a first internal cladding portion, said glass plate further comprising a second internal cladding portion extending from said peripheral edge of said main portion of said stack toward a center of said stack within an adhesive material layer.

19. The glass plate of claim 15, wherein said reinforcing element has an internal cladding portion extending toward an opposing one of said sheets of glass forming said stack, said internal cladding portion having a width smaller than a width of said opposing one of said sheets of glass.

20. The glass plate of claim 19, wherein said opposing one of said sheets of glass has a spot facing for receiving said internal cladding portion, said opposing one of said sheets of glass having a greater thickness than each of the remaining sheets of glass forming said stack.

21. The glass plate of claim 20, wherein said internal cladding portion comprises a first internal cladding portion, said glass plate further comprising a second internal cladding portion extending from said peripheral edge of said main portion of said stack toward a center of said stack within an adhesive material layer.

22. The glass plate of claim 1, wherein said reinforcing element having said main cladding portion and said at least one of an internal cladding portion and an external cladding portion has a one-piece construction.

23. The glass plate of claim 22, wherein said reinforcing element has said internal cladding portion comprising a first internal cladding portion extending from said peripheral edge of said main portion of said stack toward a center of said stack between glass sheets, said glass plate further comprising a second internal cladding portion extending from said peripheral edge of said main portion of said stack toward a center of said stack within an adhesive material layer.

24. The glass plate of claim 1, wherein said reinforcing element further has an annular cladding portion extending in a thickness direction of said stack along said peripheral edge of said main portion of said stack, said main cladding portion extending from a first side of said annular portion in the radially-outward direction, and said reinforcing element has said external cladding portion extending from a second side of said annular portion in the radially-inward direction toward said center of said stack, said annular cladding portion being, bonded to said peripheral edge of said main portion of said stack by an adhesive material.

25. The glass plate of claim 24, wherein said reinforcing element further has said internal cladding portion extending from said first side of said annular portion in the radially-inward direction toward said center of said stack.

26. The class plate of claim 1, wherein said excrescence is formed at an outer side of said stack.

27. The glass plate of claim 1, wherein said ballistic material is selected from a group of materials consisting of metals, metal alloys, plastics-fibre composite materials, and ceramics.

28. The glass plate of claim 1, wherein said stack is flat and includes:

an outermost first glass sheet, said first glass sheet comprising one of a glass ceramic sheet, an annealed glass sheet, a chemically-reinforced glass sheet, and a heat-reinforced glass sheet;

a first intermediate adhesive layer adjacent to said first glass sheet;

a second glass sheet adjacent to said first intermediate adhesive layer, said second glass sheet comprising one of an annealed glass sheet, a chemically-reinforced glass sheet, and a heat-reinforced glass sheet;

a second intermediate adhesive layer adjacent to said second glass sheet; and a layer of polycarbonate at an innermost side of said stack;

wherein each of said first intermediate adhesive layer and second intermediate adhesive layer is formed of one of a polyvinyl butyral material and a polyurethane material.

29. The glass plate of claim 28, wherein said first glass sheet, said first intermediate adhesive layer, said second glass sheet, and said second intermediate adhesive layer form a first sub-stack, said stack further including at least one additional sub-stack arranged adjacent to said first sub-stack, each additional sub-stack including:

an additional glass sheet comprising one of an annealed glass sheet, a chemically-reinforced glass sheet, and a heat-reinforced glass sheet; and an additional intermediate adhesive layer adjacent to said additional glass sheet.

30. The glass plate of claim 28, wherein said stack further includes at least one functional layer, each of said at least one functional layer comprising one of a colored layer, an optical layer, an anti-glare layer, an anti-dirt layer, an anti-scratch layer, an anti-frost layer, an antenna conductor layer, a heating wire layer, and a peripheral cladding layer formed of one of enamel and opaque paint.

31. The glass plate of claim 1, wherein said at least one of an internal cladding portion and an external cladding, portion of said reinforcing element extend toward said center of said stack a distance in a range of 0.5 cm to 3 cm from said peripheral edge of said main portion of said stack.

* * * * *